(12) United States Patent
Payne (10) Patent No.: US 10,321,003 B2
(45) Date of Patent: Jun. 11, 2019

(54) SCANNING MODULE CLEANING DEVICE

(71) Applicant: HEWLETT-PACKARD DEVELOPMENT COMPANY, L.P., Houston, TX (US)

(72) Inventor: David M. Payne, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/570,924

(22) PCT Filed: Jul. 15, 2015

(86) PCT No.: PCT/US2015/040564
§ 371 (c)(1),
(2) Date: Oct. 31, 2017

(87) PCT Pub. No.: WO2017/011003
PCT Pub. Date: Jan. 19, 2017

(65) Prior Publication Data
US 2018/0295251 A1    Oct. 11, 2018

(51) Int. Cl.
*H04N 1/00* (2006.01)
*H04N 1/024* (2006.01)
*H04N 1/04* (2006.01)
*G03G 21/00* (2006.01)

(52) U.S. Cl.
CPC ......... *H04N 1/00909* (2013.01); *G03G 21/00* (2013.01); *H04N 1/024* (2013.01); *H04N 1/04* (2013.01)

(58) Field of Classification Search
CPC ............ G03G 15/04; G03G 15/04045; G03G 16/1605; H04N 1/00909
See application file for complete search history.

(56) References Cited

U.S. PATENT DOCUMENTS

| | | |
|---|---|---|
| 7,370,659 B2 | 5/2008 | Hickman et al. |
| 8,311,440 B2 | 11/2012 | Tidrick |
| 8,831,468 B2 | 9/2014 | Yuki |
| 2002/0106229 A1 | 8/2002 | Meier et al. |
| 2007/0201113 A1 | 8/2007 | Nishikawa |
| 2008/0118287 A1 | 5/2008 | Masaki |

(Continued)

FOREIGN PATENT DOCUMENTS

| | | |
|---|---|---|
| CN | 102164225 | 8/2011 |
| CN | 102572198 | 7/2012 |

(Continued)

OTHER PUBLICATIONS

Morimoto (JP 2005-286586 A), Oct. 2013, JPO Computer Translation.*

*Primary Examiner* — Erika J Villaluna
(74) *Attorney, Agent, or Firm* — HP Inc. Patent Department; Fabian VanCott (57) ABSTRACT

In one example in accordance with the present disclosure system for cleaning a scanning module is described. The system includes a cleaning device to remove debris from a scanning surface of the scanning module and a moving device. The moving device moves the scanning module into a position away from a substrate support surface and extends a cleaning device into a scan path between the scanning surface and the substrate support surface, and rotates to oscillate the cleaning device.

15 Claims, 8 Drawing Sheets

(56) References Cited

U.S. PATENT DOCUMENTS

2014/0144469 A1    5/2014  Egan
2014/0334840 A1   11/2014  Mizuno
2015/0002914 A1    1/2015  Takahashi

FOREIGN PATENT DOCUMENTS

| CN | 102857656    |   | 1/2013  |
|----|--------------|---|---------|
| JP | 2005286586 A | * | 10/2005 |
| JP | 2008065337   |   | 3/2008  |
| JP | 2009115932 A |   | 5/2009  |
| JP | 2009143108 A |   | 7/2009  |
| JP | 2010091690 A |   | 4/2010  |
| JP | 2010103762   |   | 5/2010  |
| JP | 2011158566 A |   | 8/2011  |
| JP | 2011176669   |   | 9/2011  |
| JP | 2012042588   |   | 3/2012  |
| KR | 20100052347 A|   | 5/2010  |

\* cited by examiner

SCANNING MODULE CLEANING DEVICE

BACKGROUND

Many electronic devices, such as home or office scanners include a scanning module. A scanning module is a device that optically scans images, text, or other objects and generates a digital representation of the image, text or object. In some examples, scanner/copier automatic document feeders (ADF) receive thousands of input pages. The motion of these pages generates considerable dust (e.g., from paper fiber and toner). When this dust builds up in the optical path of the scan module the copy or scanned image quality is significantly degraded and customers are often unaware of the need to clean the optical path. As society moves to an increasingly digital age, enhanced performance of such scanning modules becomes increasingly desirable. Increased performance of a scanning module may increase output quality and customer satisfaction thereby increasing profits for a manufacturer.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

A scanning module is a component of an electronic device such as a multi-function printer that digitizes printed text, images, or other physical objects. Specifically, a scanning module includes a light source that illuminates the text, image, or physical object. The light reflects off different colors and surfaces and is collected by a photosensitive element. The collected photons are converted into electrons which are further processed to generate a digital representation of the image, text, or object. The scanned image or text is then digitized and presented to a user in an electronic format. In some examples, the scanning module includes a transparent layer, such as glass, disposed between the scanning module and the media to be scanned to protect the scanning module from damage. Over time debris builds up on the glass surface, which can result in the manifestation of artifacts in the output digitized representation.

The systems and methods of the present specification and appended claims address this and other issues. Specifically, the present application describes methods for removing debris from the transparent layer of the scanning module. Specifically, the system raises the scanning module, or wedges a cleaning device between the scanning module and a substrate support surface, to place a cleaning device underneath the scanning surface. The scanning module is positioned against the cleaning device. The cleaning device then oscillates back and forth to remove debris from the scanning module.

More specifically the present specification describes a system for cleaning a scanning module. The system includes a cleaning device to remove debris from a scanning surface of the scanning module. The system also includes a moving device. The moving device moves the scanning module into a position away from a substrate support surface, extends a cleaning device into a scan path between the scanning surface and the substrate support surface, and rotates to oscillate the cleaning device.

The present specification also describes a method for cleaning a scanning module. According to the method, a moving device moves the scanning module away from a substrate support surface. A cleaning device is extended into a scan path between the scanning module and the substrate support surface and the scanning module is positioned to place the cleaning device in contact with the scanning module and the substrate support surface. The cleaning device is then oscillated to remove debris from the scanning module.

The present specification also describes a system for cleaning a scanning module. The system includes a cleaning device to remove debris from a scanning surface of the scanning module. The cleaning device includes a flexible cleaning blade to wrap around a circumference of a shaft of the moving device and a cleaning pad disposed on a surface of the flexible cleaning blade that faces the scanning surface. The system also includes a moving device coupled to the cleaning device and selectively coupled to the scanning module. The moving device includes the shaft to, upon rotation, simultaneously move the scanning module away from a substrate support surface and extend the cleaning device between a scanning surface of the scanning module and a substrate supporting surface. The moving device also includes a coupling device to detach the moving device from the scanning module allowing the scanning module to pinch the cleaning device between the scanning module and the substrate support surface. After detachment from the scanning device, the shaft rotates back and forth to oscillate the cleaning device along the scanning surface.

Certain examples of the present disclosure are directed to a system and method for cleaning a scanning module that allows for 1) automatically cleaning a scanning surface of a scanning module; 2) reducing user interaction in the cleaning operation to increase the simplicity of operating of the scanning module; 3) maintaining quality of outputted digitized representations; and 4) providing a compact, non-invasive, and inexpensive scanning module cleaning component. However, it is contemplated that the devices and methods disclosed herein may prove useful in addressing other deficiencies in a number of technical areas. Therefore the systems and devices disclosed herein should not be construed as addressing just the particular elements or deficiencies discussed herein.

As used in the present specification and in the appended claims, the term "scan path" and similar terminology refers to the line of sight from reflected light onto a photosensitive element.

Further, as used in the present specification and in the appended claims, the term "second side scanner" and similar terminology refers to a secondary scanning device. For example, a flatbed scanner may be a first side scanner and the scanning module may be a second side scanner that faces the first side scanner.

Still further, as used in the present specification and in the appended claims, the term "operating state" may refer to a state wherein the scanning module is set up to scan a media. For example, in an operating state the scanning module may be positioned adjacent to a substrate support surface and the cleaning device is retracted.

Even further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, that the present apparatus, systems, and methods may be practiced without these specific details. Reference in the specification to "an example" or similar language indicates that a particular feature, structure, or characteristic described in connection with that example is included as described, but may not be included in other examples.

Figure 1A:
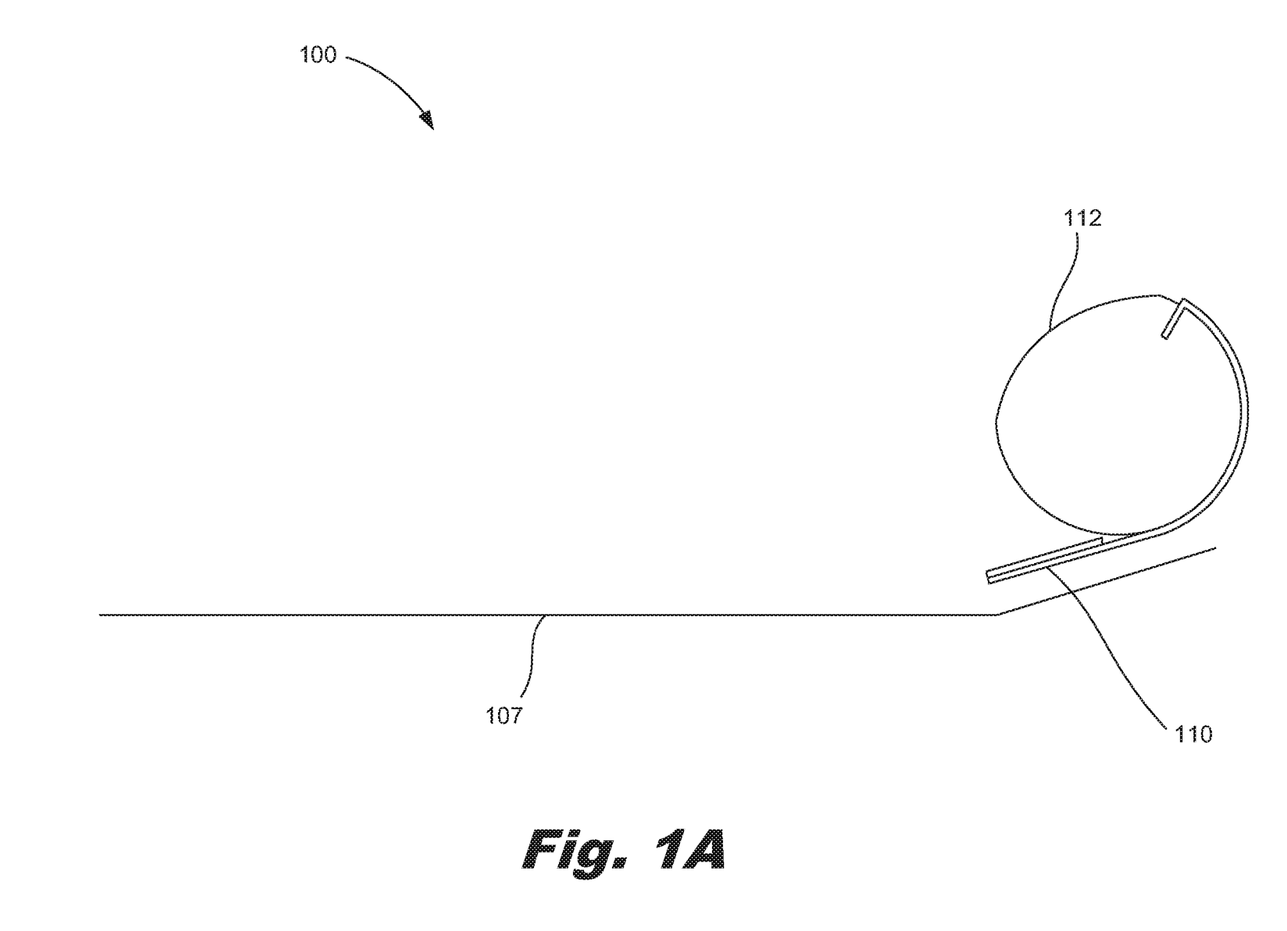
FIGS. 1A and 1B are diagrams of a system for cleaning a scanning module, according to one example of the principles described herein.
Figure 1B:
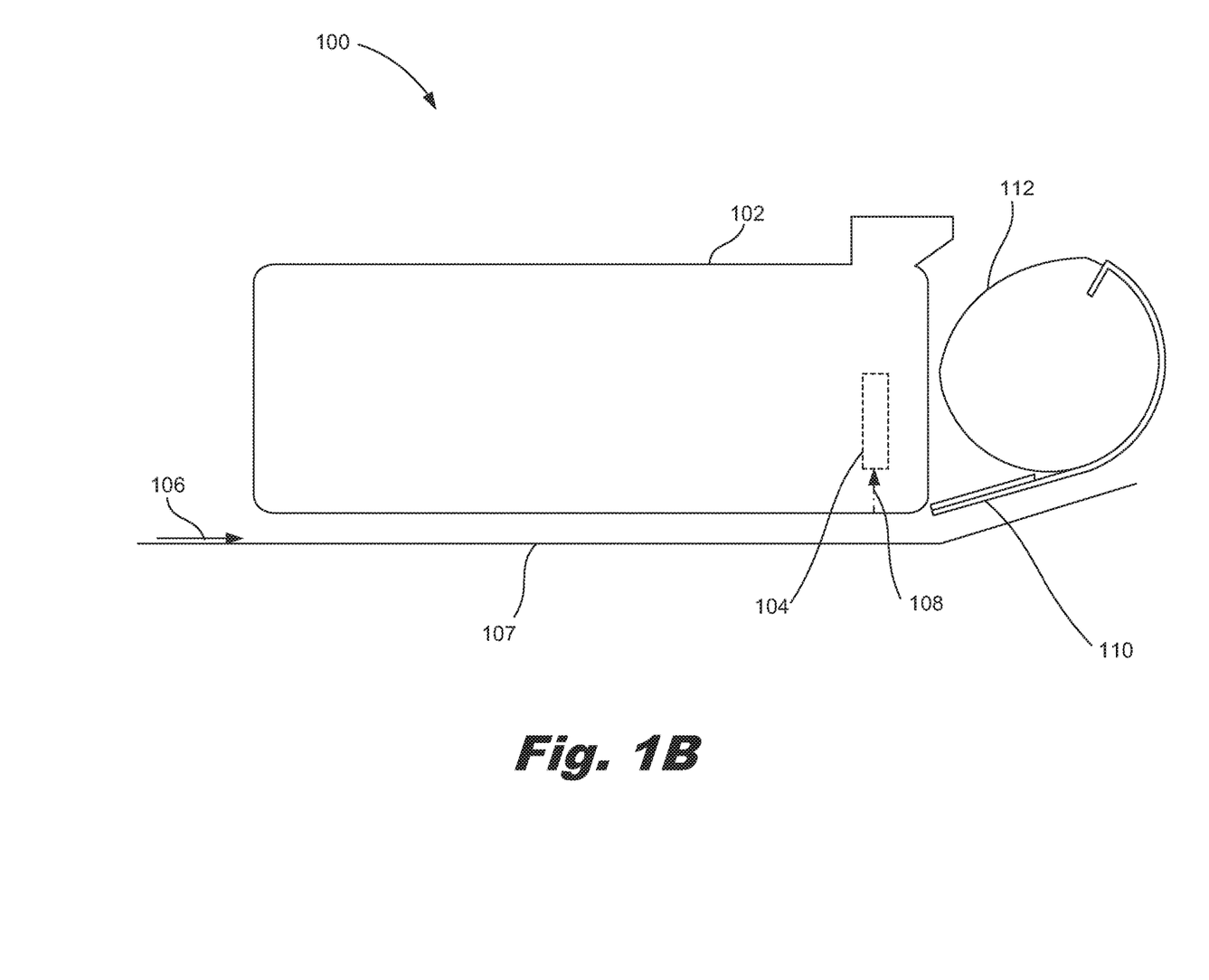

Turning now to the figures, FIGS. 1A-1B is a diagram of a system (100) for cleaning a scanning module (102), according to one example of the principles described herein.

Specifically, as depicted in FIG. 1A, the system includes a cleaning device (110) to remove debris from a scanning surface of a scanning module (102). For example, during use debris builds up on the scanning surface, potentially degrading the quality of the scanned output as the debris may block or otherwise interrupt the path of the reflected light. The interruption or blockage of these reflected light beams may manifest as artifacts on the digital output. Accordingly, by removing debris from the scanning surface, the quality of a digitized image may increase as the artifacts of such debris are reduced or eliminated.

The system (100) also includes a moving device (112) to move the scanning module (102) into a position away from a substrate support surface (107) and to extend the cleaning device (110) into the scan path (108) between the scanning surface of the scanning module (102) and the substrate support surface (107). In such a position, the cleaning device (110) is positioned to remove debris from the scanning surface. In one example, the moving device (112) moves the scanning module (102) by wedging the cleaning device (110) between the scanning module (102) and the substrate support surface (107). More specifically, the moving device (112) rotates and in so doing forces the cleaning device (110) between the scanning module (102) and the substrate support surface (107) which moves the scanning module (102) away from (in reference to FIGS. 1A and 1B, this is a vertical motion) the substrate support surface (107).

FIG. 1B depicts the system (100) as it is oriented with regards to the scanning module (102). The scanning module (102) is a device, or component of a larger system that digitizes a physical media to be output in digital form, such as via a display of a connected electronic device. Accordingly, the scanning module (102) may include a photosensitive element (104) that receives light reflected off the surface of a physical media. The reflected light is indicative of the characteristics of the media. For example, the reflected light may indicate the position of different colors of printing fluid on a page which form text or images on a print media such as paper. In FIG. 1B, the photosensitive element (104) is represented as a dashed line to indicate it is internal to the scanning module (102).

An example of the operation of the scanning module (102) is provided below. In this example, a physical media, such as paper with text and/or images, is fed underneath the scanning module (102) as indicated by the arrow (106). As it is fed, the media is supported by a substrate support surface (107). In some examples, the paper may be fed in through an auto-document feeder. In this example, the scanning module (102) may be integral to the auto-document feeder. As the media passes under the scanning module (102), a light source (not shown) shines light on to the media. Light reflected off of the media is gathered by a photosensitive element (104). These reflected light beams indicate the characteristics of the media such as the location of the text and or image as well as the coloration of the text and or image. This reflected light is collected by the photosensitive element (104) along a scan path (108). The reflected light is in the form of photons, which are converted into electrons and further processed to form a digitized output; which digitized output may be presented to a user, for example via a display of a connected device.

The scanning module (102) may include a transparent scanning surface that is adjacent to the feed path (106). For example, given the orientation of FIGS. 1A and 1B, the transparent scanning surface may be the bottom of the scanning module (102). This transparent scanning surface may, for example, 1) protect the internal components of the scanning module (102); 2) maintain the internal components of the scanning module (102) clean; 3) not interfere with the digitization of the printed text or image; and 4) form part of the paper guide in that it bounds the media in the z-axis direction (vertical direction of FIGS. 1A and 1B). In some examples, the scanning module (102) may be a component of a larger electronic device such a multi-function printer. In this example, the system (100) may be internal to the electronic device. The scanning module (102) may be a second side scanning module (102). For example, when installed in a printer, multi-function, printer, copier, scanner, auto-document feeder etc. a flatbed scanner, or first side scanning module, may scan a first side of a media that is fed into the printer, which first side scanner in the orientation of FIGS. 1A and 1B may be below the scanning module (102) facing upwards. Simultaneously, the scanning module (102) which is a second side scanning module may scan an opposite side of the media that is fed into the printer, multi-function, printer, copier, scanner, auto-document feeder etc.

The system (100) includes a cleaning device (110) that cleans the scanning surface of the scanning module (102). For example, during use debris builds up on the scanning surface, potentially degrading the quality of the scanned output as the debris may block or otherwise interrupt the path of the reflected light. The interruption or blockage of these reflected light beams may manifest as artifacts on the digital output. Accordingly, by removing debris from the scanning surface, the quality of a digitized image may increase as the artifacts of such debris are reduced or eliminated.

The system (100) also includes a moving device (112) to move the scanning module (102) into a position away from a substrate support surface (107) and to extend the cleaning device (110) into the scan path (108) between the scanning surface of the scanning module (102) and the substrate support surface (107). In such a position, the cleaning device (110) is positioned to remove debris from the scanning surface. In one example, the moving device (112) moves the scanning module (102) by wedging the cleaning device (110) between the scanning module (102) and the substrate support surface (107). More specifically, the moving device (112) rotates and in so doing forces the cleaning device (110) between the scanning module (102) and the substrate support surface (107) which moves the scanning module (102) away from (in reference to FIGS. 1A and 1B, this is a vertical motion) the substrate support surface (107).

Figure 2:
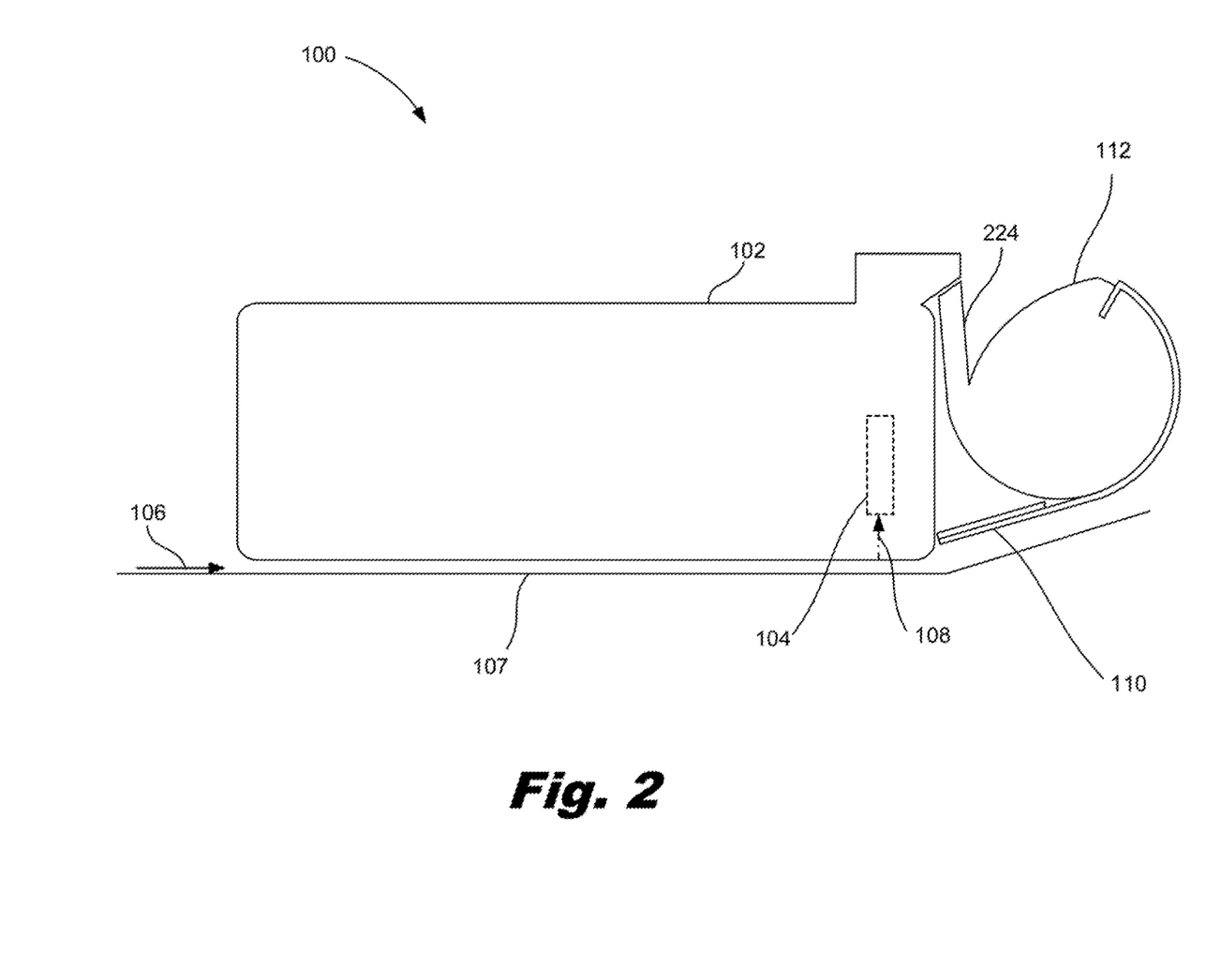
FIG. 2 is a diagram of a system for cleaning a scanning module, according to another example of the principles described herein.

In another example as depicted in FIG. 2, the moving device (112) includes a coupling device (224) that interacts with a protrusion on the scanning module (102) to lift the scanning module (102) away from the substrate support surface (107) and extend the cleaning device (110). The moving device (112) is then decoupled from the scanning module (102) such that the scanning module (102) moves and pinches the cleaning device (110) between the scanning module (102) and the substrate support surface (107). The pinching of the cleaning device (110) between the scanning module (102) and the substrate support surface (107) creates pressure which increases the effectiveness of the cleaning device (110) to remove debris from the scanning module (102). Once pinched, the moving device (112) may effectuate an oscillation of the cleaning device (110) to "scrub" debris from off of the bottom, transparent scanning surface of the scanning module (102). In some examples the moving device (112) may be cylindrical in shape to consume less space within an electronic device.

A system (100) that automatically cleans the scanning module (102) by moving the scanning module (102) and using a cleaning device (110) disposed between the scanning module (102) and a rigid surface such as a substrate support surface (107) may allow for easy, user-free cleaning of a scanning module (102) which would increase simplicity of use of the device in which the scanning module (102) is used as well as increase the quality of output of the scanning module (102).

Figure 3:
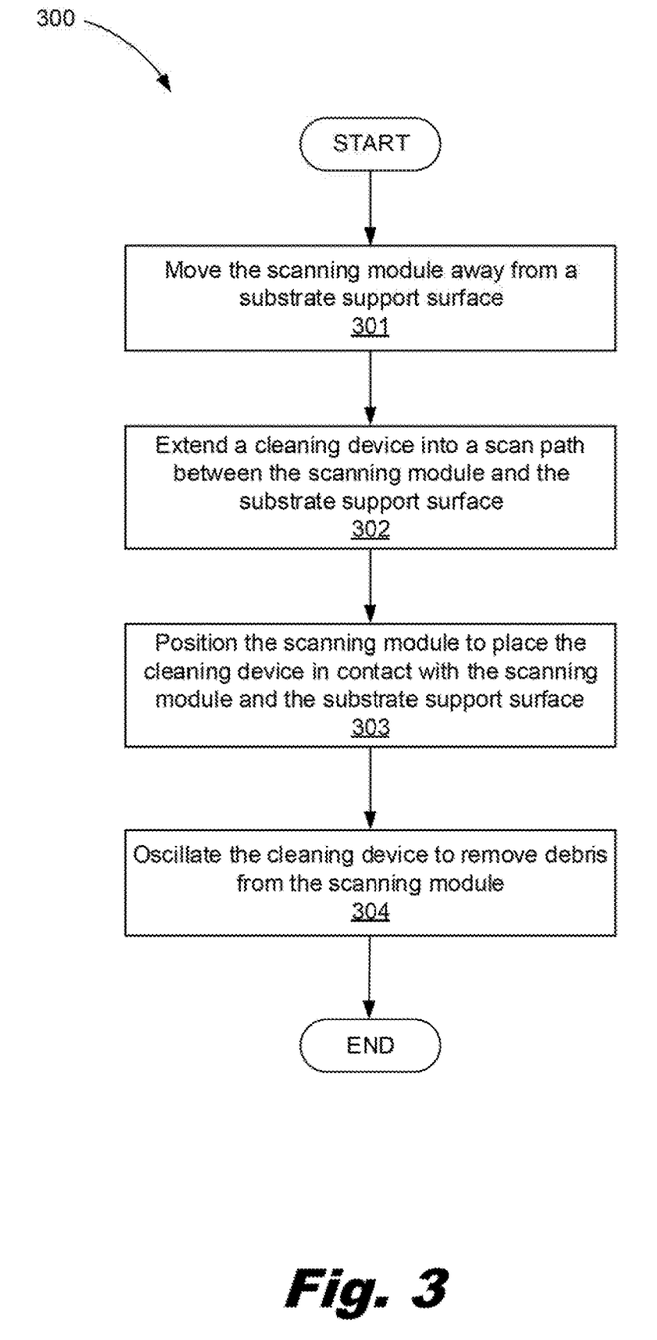
FIG. 3 is a flowchart of a method for cleaning a scanning module, according to one example of the principles described herein.
Figure 5:
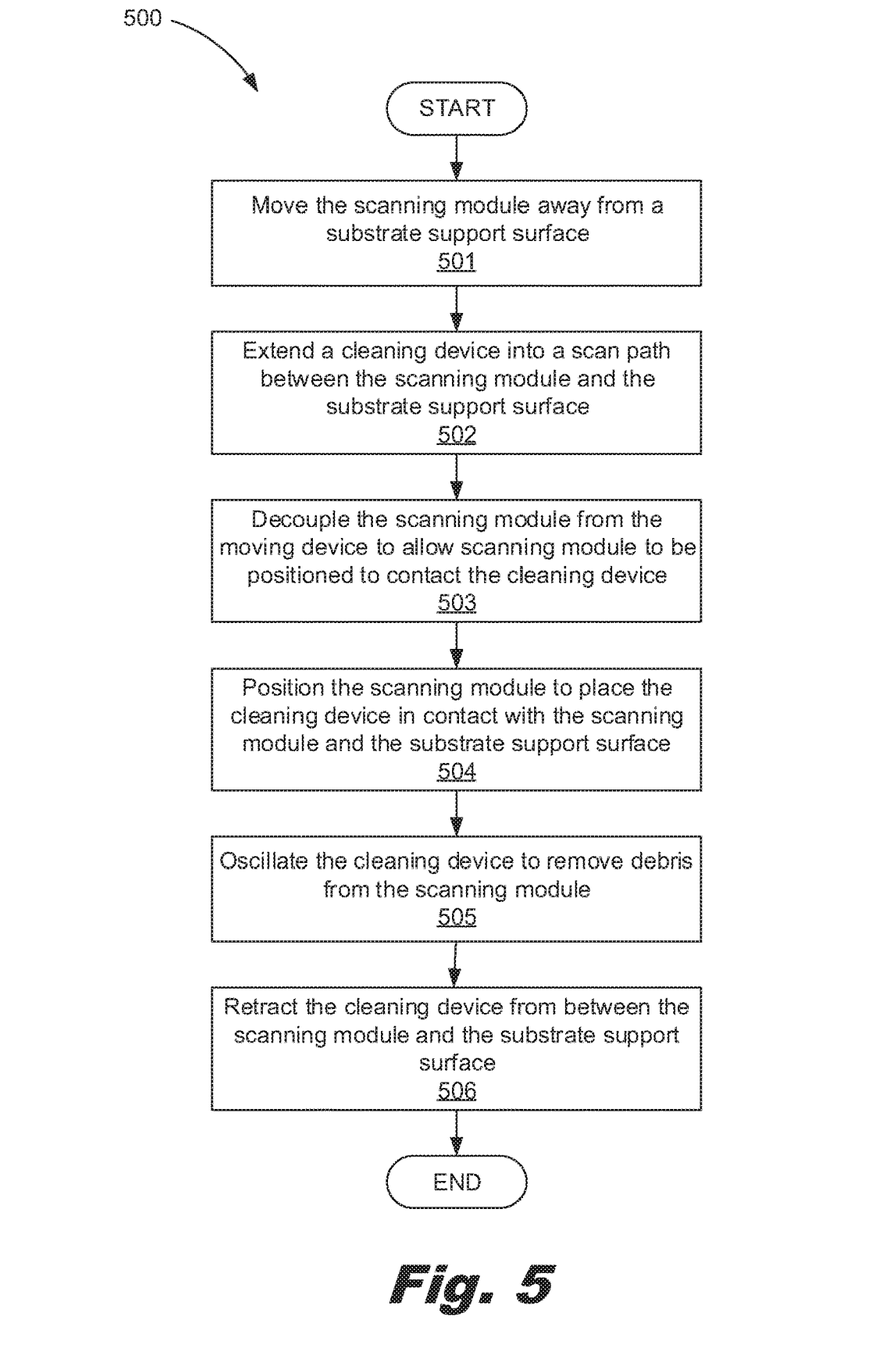
FIG. 5 is a flowchart of a method for cleaning a scanning module, according to another example of the principles described herein.

FIG. 3 is a flowchart of a method (300) for cleaning a scanning module (FIG. 1B, 102), according to one example of the principles described herein. As a general note, the methods (300, 500) may be described below as being executed or performed by at least one device, for example, the electronic system (FIG. 1A, 100). Other suitable systems and/or computing devices may be used as well. The methods (300, 500) may be implemented in the form of executable instructions stored on at least one machine-readable storage medium of at least one of the devices on which the system (FIG. 1A, 100) is part of, and executed by at least one processor of at least one of the devices. While FIGS. 3 and 5 depict operations occurring in a particular order, a number of the operations of the methods (300, 500) may be executed concurrently or in a different order than shown in FIGS. 3 and 5. In some examples, the methods (300, 500) may include more or less operations than are shown in FIGS. 3 and 5. In some examples, a number of the operations of the methods (300, 500) may, at certain times, be ongoing and/or may repeat.

The method (300) may include moving (block 301), via the moving device (FIG. 1A, 112), the scanning module (FIG. 1B, 102) away from the substrate support surface (FIG. 1B, 107). The substrate support surface (FIG. 1B, 107) may be a surface over which the media passes. For example, in an auto-document feeder, media may be passed over a glass surface of a flatbed, first side scanning module. The glass surface of this flatbed scanner may be the substrate support surface (FIG. 1B, 107). Moving (block 301) the scanning module (FIG. 1B, 102) away from a substrate support surface (FIG. 1B, 107) allows for the positioning of the cleaning device (FIG. 1A, 110) between the scanning module (FIG. 1B, 102) and the substrate support surface (FIG. 1B, 107). The movement (block 301) of the scanning module (FIG. 1B, 102) may include moving the scanning module (FIG. 1B, 102) using a coupling device (FIG. 2, 224) of the moving device (FIG. 1A, 112) or by wedging the cleaning device (FIG. 1A, 110) between the scanning module (FIG. 1B, 102) and the substrate support surface (FIG. 1B, 107). In some examples, moving the scanning module (FIG. 1B, 102) may include translation of the scanning module (FIG. 1B, 102) where as in other examples, moving the scanning module (FIG. 1B, 102) may include rotation of the scanning module (FIG. 1B, 102).

The method (300) also includes extending (block 302) the cleaning device (FIG. 1A, 110) into a scan path (FIG. 1B, 108) between the scanning module (FIG. 1B, 102) and the substrate support surface (FIG. 1B, 107). As the scan path (FIG. 1B, 108) is the location where reflected light is received, it is desirable for the scanning surface of the scanning module (FIG. 1B, 102) adjacent to this scan path (FIG. 1B, 108) to be cleaned by the cleaning device (FIG. 1A, 110).

Moving (block 301) the scanning module (FIG. 1B, 102) and extending (block 302) the cleaning device (FIG. 1A, 110) into position may be performed simultaneously by a single motion of the moving device (FIG. 1A, 112). For example, as the moving device (FIG. 1A, 112) rotates in one direction, the scanning module (FIG. 1A, 112) may be raised and the cleaning device (FIG. 1A, 110) may be uncoiled from the circumference of the moving device (FIG. 1A, 112) to extend below the scan path (FIG. 1B, 108) of the scanning module (FIG. 1B, 102). In another example, as the moving device (FIG. 1A, 112) rotates in one direction, the cleaning device (FIG. 1A, 110) may be uncoiled from the circumference of the moving device (FIG. 1A, 112) and wedged underneath the scanning module (FIG. 1B, 102), which wedging motion may raise the scanning module (FIG. 1A, 112). Such a simultaneous motion may enhance the efficiency of a system by reducing the number of components to perform the different motions. Rather as described herein a single component, i.e., the moving device (FIG. 1A, 112) may both raise the scanning module (FIG. 1B, 102) and extend the cleaning device (FIG. 1A, 110).

The method (300) also includes positioning (block 303) the scanning module (FIG. 1B, 102) to place the cleaning device (FIG. 1A, 110) in contact with the scanning module (FIG. 1B, 102) and the substrate support surface (FIG. 1B, 107). For example, if the scanning module (FIG. 1B, 102) has been raised by the coupling device (FIG. 2, 224), the moving device (FIG. 1A, 110) may decouple from the scanning module (FIG. 1B, 102) such that the scanning module is allowed to be positioned against the cleaning device (FIG. 1A, 110). In this orientation, the cleaning device (FIG. 1A, 110) is effectively pinched between the substrate support surface (FIG. 1B, 107) and the scanning module (FIG. 1B, 102) creating pressure on the cleaning device (FIG. 1A, 110). This pressure increases the friction between the cleaning device (FIG. 1A, 110) and the scanning module (FIG. 1B, 102) to increase the effectiveness of the cleaning device (FIG. 1A, 110) at removing debris from the scanning module (FIG. 1B, 102).

Once pinched between the scanning module (FIG. 1B, 102) and the substrate support surface (FIG. 1B, 107), the cleaning device (FIG. 1A, 110) is oscillated (block 304) back and forth to scrub and remove debris from the scanning surface of the scanning module (FIG. 1B, 102). More specifically, the moving device (FIG. 1A, 112) may rotate back and forth. As the moving device (FIG. 1A, 112) is coupled to the cleaning device (FIG. 1A, 110), such rotation oscillates the cleaning device (FIG. 1A, 110) back and forth under the scan path (FIG. 1B, 108) to remove the debris.

Accordingly, the method (300) allows for cleaning of a scanning module (FIG. 1B, 102) with, for example, a reduced number of operations as the scanning module (FIG. 1B, 102) is moved simultaneous to the extension of the cleaning device (FIG. 1A, 110). Moreover such an operation may be carried out, for example, with little user involvement so as to ensure regular cleaning and enhanced performance. In some examples, moving (block 301) the scanning module (FIG. 1B, 102), extending (block 302) a cleaning device (FIG. 1A, 110), positioning (block 303) the scanning module (FIG. 1B, 102), and oscillating (block 304) the cleaning device (FIG. 1A, 110) may be part of a cleaning cycle that is executed based on a schedule. For example, the cleaning cycle may be executed after a predetermined number of scans have been executed or at a set period of a day, for example at night when the scanning module (FIG. 1B, 102) is less likely to be in use.

Figure 4A:
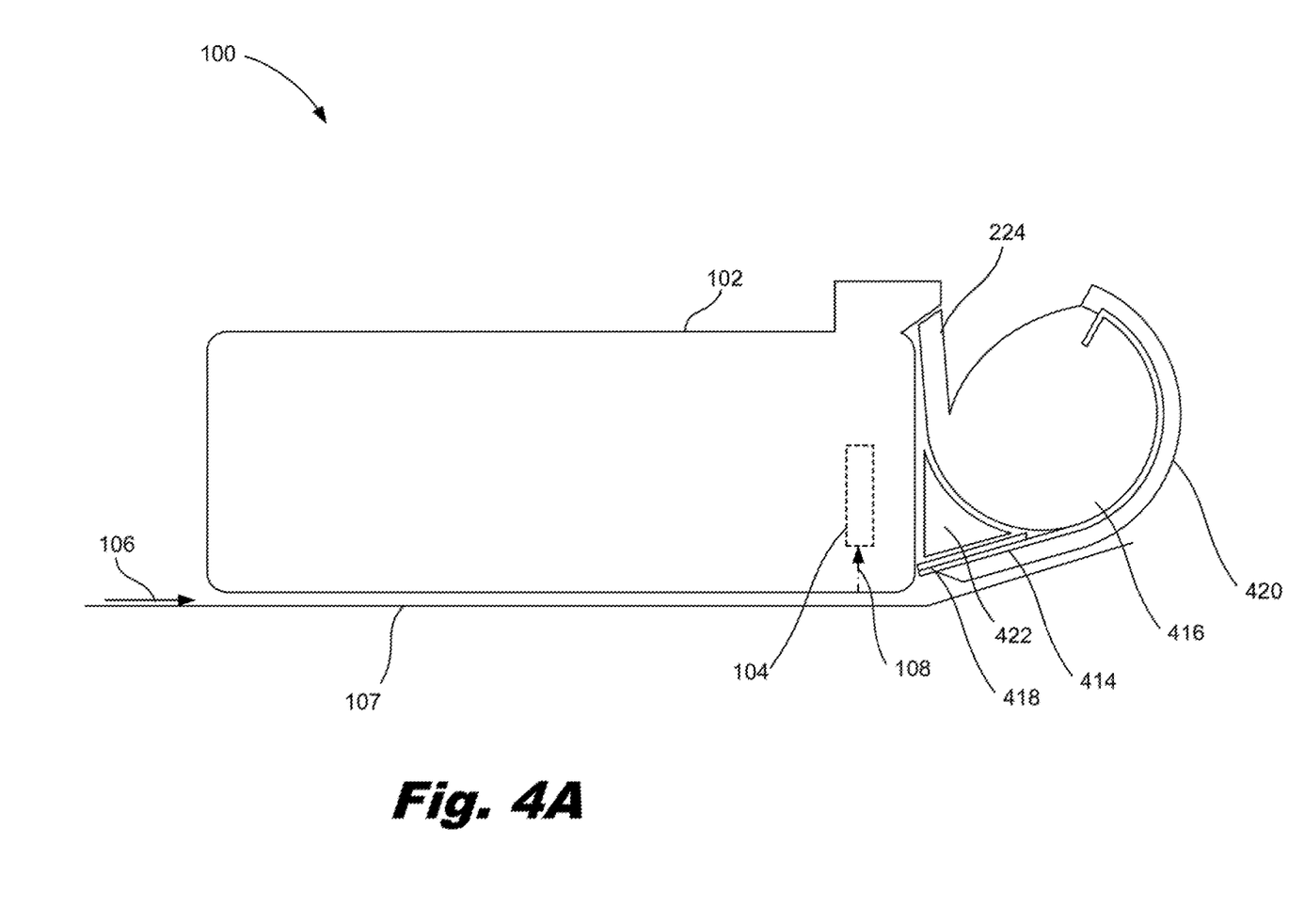
FIGS. 4A-4C are diagrams of an operation of the system for cleaning a scanning module, according to one example of the principles described herein.
Figure 4B:
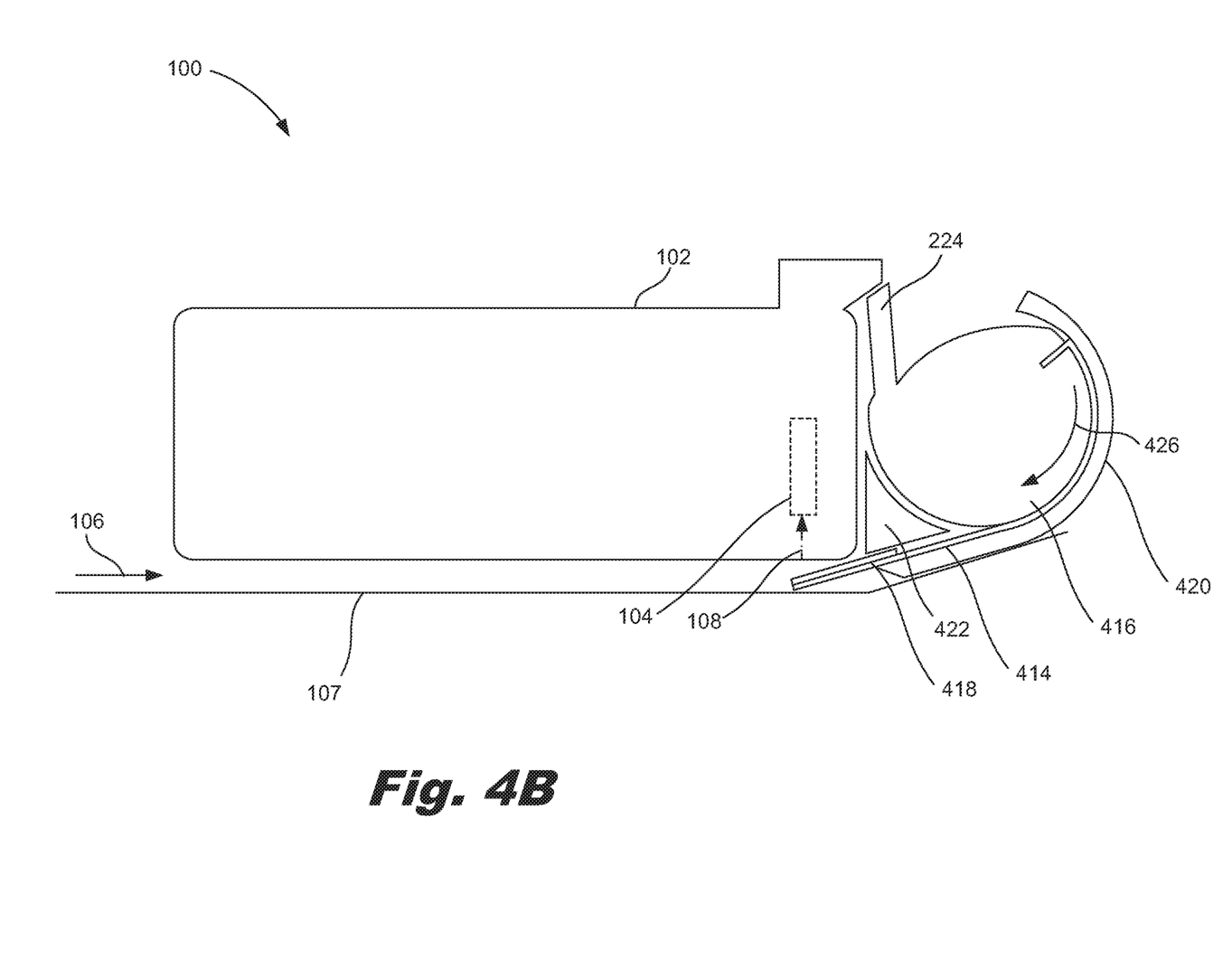
Figure 4C:
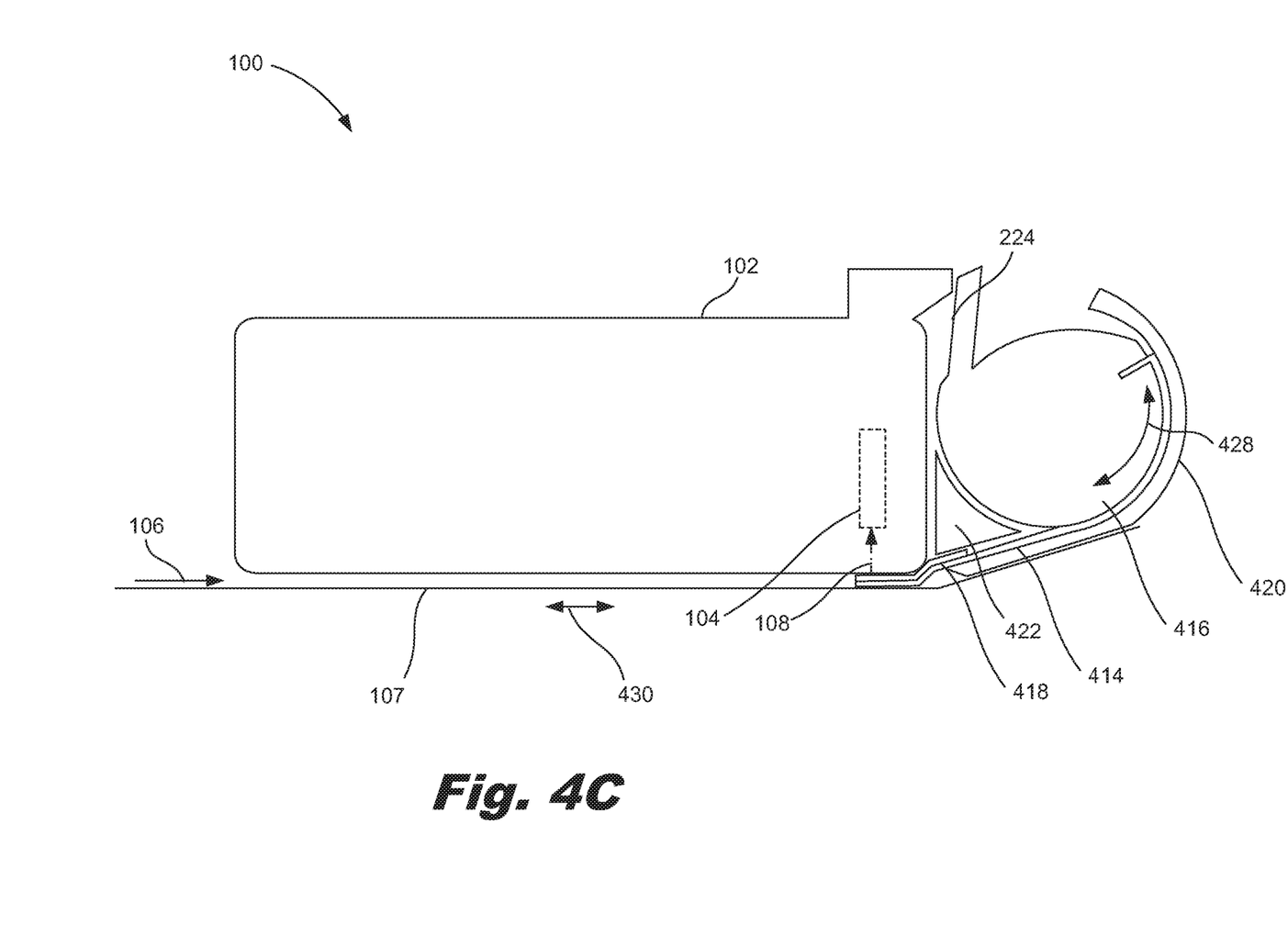

FIGS. 4A-4C are diagrams of an operation of the system (100) cleaning the scanning module (102), according to one example of the principles described herein. Specifically, FIG. 4A depicts the scanning module (102) in an operating state. In an operating state, a media, such as paper may be passed underneath the scanning module (102) as indicated by the arrow (106) to be illuminated by a light source (not shown). Light reflected off of the media passes along a scan path (108) to a photosensitive element (104) to be further processed and converted into a digital image. In the operating state, the scanning module (102) is positioned close to the substrate support surface (107), such as the glass surface of a first side scanning module, and the cleaning device (FIG. 1A, 110) is in a retracted state.

The cleaning device (FIG. 1A, 110) may include a flexible cleaning blade (414) to wrap around a circumference of a shaft (416) of the moving device (FIG. 1A, 112). When the scanning module (102) is in an operating state, the flexible cleaning blade (414) may be wrapped around the shaft (416) of the moving device (FIG. 1A, 112). Upon rotation of the shaft (416), the flexible cleaning blade (414) may extend so as to position a cleaning pad (418) disposed on the flexible cleaning blade (414) into the scan path (108) of the scanning module (102). Accordingly, the flexible cleaning blade (414) may be formed of a substance that is 1) stiff enough to provide a force to move the cleaning pad (418) into position and convert a rotation of the shaft (416) into a lateral translation such that the cleaning pad (418) oscillates against the scanning surface of the scanning module (102) and 2) is also sufficiently flexible to allow the cleaning blade (414) to wrap around the shaft (416) when not in use. As a specific example, the cleaning blade (414) may be made of aluminum or other metallic substance. As the cleaning blade (416) is flexible, the moving device (FIG. 1A, 112) may include a shroud (420) and a cleaning guide (422) to guide the motion of the cleaning blade (414) between the cleaning position and the retracted position.

Once in position, the cleaning pad (418) is oscillated back and forth against the scanning surface of the scanning module (102) to remove dirt and debris. The cleaning pad (418) may be an abrasive type pad. The cleaning pad (418) may be any material that removes debris from the scanning module (102). For example, the cleaning pad (418) may be a fabric that generates a static charge between debris, thus attracting and retaining the debris gathered from the scanning surface of the scanning module (102). In some examples, the cleaning pad (418) may be a dry surface and in other examples, the cleaning pad (418) may be a lubricious material. Some examples of cleaning pad (418) materials include felt and an abrasive impregnated woven nylon.

The moving device (FIG. 1A, 112) includes a shaft (416) that rotates to both move the scanning module (102) and extend the cleaning blade (414) and cleaning pad (418) into a position between the scanning module (102) and the substrate support surface (107). As will be described in FIG. 4B, via a single motion, i.e., a rotation, the shaft (416) may simultaneously move the scanning module (102) and extend the cleaning blade (414) and cleaning pad (418). The shaft (416) may be rotated by a motor of a printer, or other electronic device, in which the scanning module (102) and the system (100) are installed.

The moving device (FIG. 1A, 112) also includes a coupling device (224) to detach the moving device (FIG. 1A, 112) from the scanning module (102). In other words, the moving device (FIG. 1A, 112) may be coupled to the cleaning device (FIG. 1A, 110) and may be selectively coupled to the scanning module (102). The coupling device (224) may be made of a flexible material such that it may deflect out of the way of the protrusion of the scanning module (102) to re-engage the scanning module (102) after the scanning module (102) has been cleaned yet have enough strength that, when pushing against the protrusion, moves the scanning module (102) away from the substrate support surface (107).

FIG. 4B depicts the moving device (FIG. 1A, 112) lifting the scanning module (102) away from the substrate support surface (107). As can be seen in FIG. 4B, as the shaft (416) rotates, indicated by the arrow (426), the coupling device (224) raises the scanning module (102) and the cleaning blade (414) is simultaneously extended to position the cleaning pad (418) underneath the scan path (108) of the scanning module (102). In other words, at this stage, the coupling device (224) couples the moving device (FIG. 1A, 112) to the scanning module (102) to lift the scanning module (102) into a position away from the substrate support surface (107).

FIG. 4C depicts the moving device (FIG. 1A, 112) decoupled from the scanning module (102) such that the scanning module (102) is lowered to pinch the cleaning blade (414) and cleaning pad (418) between the scanning module (102) and the substrate support surface (107). In this state the coupling device (224) decouples the moving device (FIG. 1A, 112) from the scanning module (102) to allow the scanning module (102) to pinch the cleaning device (FIG. 1A, 110) between the scanning module (102) and the substrate support surface (107). Pinching the cleaning pad (418) between the scanning module (102) and the substrate support surface (107) may increase friction between the cleaning pad (418) and the scanning module (102) so as to increase the cleaning effect of the cleaning pad (418). In this state the system (100) can clean the scanning surface of the scanning module (102).

More specifically, the shaft (416) is driven to rotate back and forth as indicated by the arrow (428). Such rotational motion is transferred along the cleaning blade (414) as a lateral translation of the end portion of the cleaning blade (414) and the cleaning pad (418) as indicated by the arrow (430). Such lateral motion serves to remove debris from the scanning surface. As described above, the cleaning pad (418) may be formed of such a material so as to retain collected debris removed from the scanning surface.

After cleaning, the shaft (416) is rotated to re-engage the coupling device (224) with the scanning module (102).

More specifically, the coupling device (224) deflects as it slides across the protrusion to return to a position as indicated in FIG. 4A. In other words, the coupling device (224) moves to re-couple the scanning module (102) to the moving device (110).

FIG. 5 is a flowchart of a method (500) for cleaning a scanning module (FIG. 1B, 102), according to another example of the principles described herein. According to the method (500), the scanning module (FIG. 1B, 102) is moved (block 501) away from a substrate support surface (FIG. 1B, 107). This may be performed as described in connection with FIG. 3. The cleaning device (FIG. 1A, 110) is extended (block 502) into a scan path (FIG. 1B, 108) between the scanning module (FIG. 1B, 102) and the substrate support surface (FIG. 1B, 107). This may be performed as described in connection with FIG. 3.

The scanning module (FIG. 1B, 102) is decoupled (block 503) from the moving device (FIG. 1A, 112) to allow the scanning module (FIG. 1B, 102) to be positioned to contact the cleaning device (FIG. 1A, 110). In this fashion, the moving device (FIG. 1A, 112) is selectively coupled to the scanning module (FIG. 1B, 102). After decoupling, the scanning module (FIG. 1B, 102) is positioned (block 504) to place the cleaning device in contact with the scanning module (FIG. 1A, 102) and the substrate support surface (FIG. 1B, 107). This may be performed as described in connection with FIG. 3. The cleaning device (FIG. 1A, 110) is then oscillated (block 505), for example by the shaft (FIGS. 4, 416), to remove debris from the scanning module (FIG. 1B, 102). This may be performed as described in connection with FIG. 3.

After the scanning module (FIG. 1B, 102) has been adequately cleaned, the cleaning device (FIG. 1A, 110) is retracted (block 506) from between the scanning module (FIG. 1B, 102) and the substrate support surface (FIG. 1B, 107) such that the scanning module (FIG. 1B, 102) may continue operation of scanning media to form digitized images.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code received by the system (FIG. 1A, 100). The computer usable program code may be provided to a processor of a general purpose computer, special purpose computer, or other programmable data processing apparatus to produce a machine, such that the machine-readable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Certain examples of the present disclosure are directed to a system and method for cleaning a scanning module allows for 1) automatically cleaning a scanning surface of a scanning module; 2) reducing user interaction in the cleaning to increase simplicity of operation of the scanning module; 3) maintaining quality of outputted digitized representations; and 4) provides a compact, non-invasive and compact scanning module cleaning component. However, it is contemplated that the devices and methods disclosed herein may prove useful in addressing other deficiencies in a number of technical areas. Therefore the systems and devices disclosed herein should not be construed as addressing just the particular elements or deficiencies discussed herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for cleaning a scanning module comprising:
    a cleaning device to remove debris from a scanning surface of the scanning module; and
    a moving device to:
        move the scanning module into a position away from a substrate support surface;
        extend a cleaning device into a scan path between the scanning surface and the substrate support surface; and
        rotate to oscillate the cleaning device.

2. The system of claim 1, further comprising a coupling device of the moving device to:
    couple the moving device to the scanning module to move the scanning module into a position away from the substrate support surface; and
    decouple the moving device from the scanning module to allow the scanning module to pinch the cleaning device between the scanning module and the substrate support surface and to allow the moving device to oscillate the cleaning device.

3. The system of claim 1, wherein by a single motion the moving device simultaneously moves the scanning module into the position away from the substrate support surface and extends the cleaning device into the scan path between the scanning surface and the substrate support surface.

4. The system of claim 3, wherein the moving device moves the scanning module into a position away from a substrate support surface by wedging the cleaning device between the scanning module and the substrate support surface.

5. The system of claim 1, wherein:
    the scanning module is part of a printer, a scanner, an auto-document feeder, a copier, or a multi-function printer; and,
    the system is internal to the printer, the scanner, the auto-document feeder, the copier, or the multi-function primer.

6. The system of claim 1, wherein the scanning module is a second side scanning module.

7. A method for cleaning a scanning module comprising:
    moving, via a moving device, the scanning module away from a substrate support surface;
    extending, via the moving device, a cleaning device into a scan path between the scanning module and the substrate support surface;
    positioning the scanning module to place the cleaning device in contact with the scanning module and the substrate support surface; and
    oscillating the cleaning device to remove debris from the scanning module.

8. The method of claim 7, wherein moving the scanning module away from the substrate support surface and extending the cleaning device into the scan path between the scanning module and the substrate support surface are performed simultaneously by a single motion of the moving device.

9. The method of claim 7, further comprising decoupling the scanning module from the moving device to allow the scanning module to be positioned to contact the cleaning device.

10. The method of claim 9, further comprising re-coupling, the scanning module to the moving device.

11. The method of claim 7, further comprising retracting the cleaning device from between the scanning module and the substrate support surface to return the scanning module to an operating state.

12. The method of claim 7, wherein moving the scanning module, extending a cleaning device, positioning the scanning module, and oscillating the cleaning device are part of a cleaning cycle that is executed based on a schedule.

13. A system for cleaning a scanning module comprising:
   a cleaning device to remove debris from a scanning surface of the scanning module comprising:
      a flexible cleaning blade to wrap around a circumference of a shaft; and
      a cleaning pad disposed on a surface of the flexible cleaning blade that faces the scanning surface; and
   a moving device coupled to the cleaning device and selectively coupled to the scanning module comprising:
      the shaft to, upon rotation, simultaneously move the scanning module away from a substrate support surface and extend the cleaning device between a scanning surface of the scanning module and a substrate supporting surface; and
      a coupling device to detach the moving device from the scanning module allowing the scanning module to pinch the cleaning device between the scanning module and the substrate support surface;
      wherein after detaching from the scanning module, the shaft rotates back and forth to oscillate the cleaning device along the scanning surface.

14. The system of claim 13, further comprising a shroud and a cleaning guide to guide the cleaning device into a position between the scanning module and the substrate support surface.

15. The system of claim 13, wherein the shaft is rotated by a motor of a printer in which the scanning module and system are installed.

* * * * *

UNITED STATES PATENT AND TRADEMARK OFFICE
CERTIFICATE OF CORRECTION

PATENT NO. : 10,321,003 B2  
APPLICATION NO. : 15/570924  
DATED : June 11, 2019  
INVENTOR(S) : David M. Payne et al.

Page 1 of 1

It is certified that error appears in the above-identified patent and that said Letters Patent is hereby corrected as shown below:

In the Claims

In Column 10, Line 48, Claim 5, delete "and," and insert -- and --, therefor.

In Column 10, Line 51, Claim 5, delete "primer." and insert -- printer. --, therefor.

In Column 11, Lines 8-9, Claim 10, delete "re-coupling," and insert -- re-coupling --, therefor.

Signed and Sealed this
Seventeenth Day of December, 2019

Andrei Iancu
*Director of the United States Patent and Trademark Office*